US007987945B2

(12) United States Patent
Petersen

(10) Patent No.: US 7,987,945 B2

(45) Date of Patent: Aug. 2, 2011

(54) METHOD FOR REGULATING THE TRACTION IN A LINE OF A LADDER CLIMBING ASSISTANCE DEVICE AND LADDER CLIMBING ASSISTANCE DEVICE

(75) Inventor: Peter Gunnar Petersen, Fredensborg (DK)

(73) Assignee: Avanti Stigefabrik A/S, Hillerod (DK)

( * ) Notice: Subject to any disclaimer, the term of this patent is extended or adjusted under 35 U.S.C. 154(b) by 1177 days.

(21) Appl. No.: 10/598,724

(22) PCT Filed: Mar. 10, 2005

(86) PCT No.: PCT/DK2005/000162

§ 371 (c)(1),
(2), (4) Date: Jan. 30, 2007

(87) PCT Pub. No.: WO2005/088063

PCT Pub. Date: Sep. 22, 2005

(65) Prior Publication Data

US 2007/0158137 A1 Jul. 12, 2007

(30) Foreign Application Priority Data

Mar. 12, 2004 (DK) ................................ 2004 00404

(51) Int. Cl.
*B65G 15/00* (2006.01)
*E06C 7/18* (2006.01)

(52) U.S. Cl. ............................................ 182/8; 182/43

(58) Field of Classification Search .................... 182/42, 182/43, 8, 18, 5, 192
See application file for complete search history.

(56) References Cited

U.S. PATENT DOCUMENTS

| | | | | |
|---|---|---|---|---|
| 7,395,899 | B2 * | 7/2008 | May | 182/142 |
| 7,537,087 | B2 * | 5/2009 | May | 182/142 |
| 7,798,288 | B2 * | 9/2010 | Blasek | 182/42 |
| 7,849,965 | B2 * | 12/2010 | May | 182/142 |
| 2004/0154869 | A1 * | 8/2004 | May | 187/239 |
| 2005/0252719 | A1 * | 11/2005 | May | 182/48 |
| 2008/0265227 | A1 * | 10/2008 | May | 254/334 |
| 2009/0211844 | A1 * | 8/2009 | May | 182/142 |
| 2009/0249712 | A1 * | 10/2009 | Brickell et al. | 52/173.1 |
| 2011/0048853 | A1 * | 3/2011 | Brickell | 182/5 |

FOREIGN PATENT DOCUMENTS

| | | |
|---|---|---|
| DE | 202 16 895 U1 | 1/2003 |
| EP | 1277495 | 1/2003 |
| EP | 1319796 | 6/2003 |
| FR | 2 440 906 | 6/1980 |
| WO | WO-03/071083 | 8/2003 |

* cited by examiner

*Primary Examiner* — Katherine Mitchell
*Assistant Examiner* — Jaime F Cardenas-Garcia
(74) *Attorney, Agent, or Firm* — Fish & Richardson P.C.

(57) ABSTRACT

A method for regulating the traction in a line (13) of a ladder climbing assistance device, in which method any movement of the line (13) is sensed and in dependence of the sensed movement either increasing the traction in the line to a predetermined high level ($L_1$), maintaining the traction at a predetermined high level ($L_1$), or decreasing the traction to a predetermined low level ($L_0$). Furthermore, a ladder climbing assistance device comprising a line (13) that is movable along the ladder (1) and a motor (8) with a power outlet arranged to provide an essentially constant traction in the line (13). The ladder climbing assistance device comprises sensing means (25) for sensing any movement of the line (13), which sensing means is connected to controlling means (26) for controlling the power outlet from the motor (8) in response to signals from the sensing means in the above-described manner.

21 Claims, 2 Drawing Sheets

METHOD FOR REGULATING THE TRACTION IN A LINE OF A LADDER CLIMBING ASSISTANCE DEVICE AND LADDER CLIMBING ASSISTANCE DEVICE

CROSS REFERENCE TO PRIOR APPLICATION

The above referenced application is a National Phase of International Patent Application No. PCT/DK2005/00016, 2filed Mar. 10, 2005, which claims priority from Danish Application No. PA 2004 00404, filed Mar. 12, 2004, which is incorporated by reference herein. The International application was published in English on Sep. 22, 2005 as WO 2005/088063 A1.

The invention relates to a method for regulating the traction in a line of a ladder climbing assistance device, and a ladder climbing assistance device for use with an essentially vertical ladder, which ladder climbing assistance device comprises a line that is movable along the ladder and a motor with a power outlet arranged to provide an essentially constant traction in the line.

Such ladder climbing assistance devices are especially useful in connection with ladders provided in windmills, masts, towers, silos, deep wells, etc. and are of great benefit, wherever maintenance and installation personnel have to carry tools or other ballast with them during their ascent or descent.

WO 03/071083 describes a ladder climbing assistance device comprising a line that forms a closed loop around a first wheel arranged at the upper end of the ladder and a second wheel arranged at the lower end of the ladder. A motor is provided at the upper end of the ladder and is drivingly engaged with the first wheel. Whenever a person is to ascend or descend the ladder he connects himself to the line by any suitable means, such as a clamping device that in turn is connected to a harness worn by the person, and starts the motor by pulling a start/stop switch rope arranged close to the ladder. The motor is controlled to provide a constant traction to the line of e.g. 400 N (corresponding to about 40 kg) and the person therefore experiences that his weight is correspondingly reduced. In this way ascending and descending the ladder is substantially facilitated since a person with a body weight of e.g. 75 kg only has to carry 35 kg.

Other similar ladder climbing assistance devices provided with a closed loop line are known from e.g. EP-A1-1 319 796, DE-U1-202 16 895 and FR-A1-2 440 906. Ladder climbing assistance devices provided with an open line that is winded on a winch and is provided with a carriage that is slidably arranged on a guide are known from e.g. EP-A1-1 277 495.

In all the ladder climbing assistance devices shown in the above-mentioned references, except the one shown in FR-A1-2 440 906, the starting/stopping of the motor is operated by activating an element, such as a switch rope, located close to the ladder.

In the ladder climbing assistance device described in FR-A1-2 440 906 the motor is started/stopped by pulling the line itself. The line is in frictional engagement with a wheel that is connected to the motor, and complicated switch devices that are physically activated by the line are arranged for switching the motor on and off. The switch devices comprise displaceable members that are shifted when a downwardly directed force is applied to the line on either side of the motor. This ladder climbing assistance device has a number of drawbacks. First, in order to switch the motor on a certain force must be provided to the line, since some kind of spring must be compressed or the whole motor must be rotated. This requires that the person must grab the line firmly and the immediate start of the motor entails a great risk of injury, either in form of burns on the hands or other hand injuries if e.g. the line jerks off the glove. Second, if the person utilising the ladder climbing assistance device intends to take a rest without being exposed to any force from the line he must be very careful not to apply any downwardly force to the line since this will immediately start the motor.

However, the number of immediately accessible elements can be considerably reduced when the start/stop mechanism is activated by the line itself, and it is thus desirable to use this general principle in relation to ladder climbing assistance devices in stead of the principle where a separate start/stop rope is used. It is therefore an object of the present invention to provide a method for regulating the traction in a line of a ladder climbing assistance device of the type described and a ladder climbing assistance device suitable for this method.

In accordance with the invention the method for regulating the traction in a line of a ladder climbing assistance device comprises the steps of:

sensing any movement of the line; and when no traction is applied to the line and movement of the line is sensed for a first predetermined period of time, the traction is increased to a predetermined high level; and when traction is applied to the line and movement of the line is sensed for a second predetermined period of time, the traction is maintained at the predetermined high level; and when traction is applied to the line and no movement of the line is sensed for the second predetermined period of time, the traction is decreased to a predetermined low level.

By incorporating time periods for sensing whether the line is moved or not is accomplished that small movements of the line does not initiate traction in the line. Small movements of the line may occur when a person connects himself to the line and it could be crucial if these small movements of the line would initiate traction in the line before the person is prepared. Also, if the person takes a rest on the ladder and does not want to experience a force from the line he simply stands still and after a predetermined period of time the traction in the line is reduced. Even at rest it is in practice not possible to avoid small movements of the line, which, however, in accordance with the invention will not initiate traction in the line.

It should be emphasized that the term “line” when used in this specification is intended to include any form of a flexible, elongate element capable of fulfilling the described function, i.e. including steel wires, ropes, straps, chains and other flexible, elongate elements.

Of practical reasons the predetermined values indicated above are preferably set in accordance with the following:

Both the first and second predetermined periods of time are set between 0.1 and 10 seconds, preferably between 0.2 and 5 seconds, and most preferably between 0.4 and 2 seconds.

The predetermined high level for the traction is set between 100 N and 800 N, preferably between 200 N and 600 N, and most preferably between 300 N and 500 N.

The predetermined low level for the traction is set below 100 N, preferably below 50 N, and most preferably set to 0 N.

In order to avoid the person using the ladder climbing assistance device to experience a sudden loss of weight reduction the decrease of the traction the predetermined low level takes place over a period of time, which may be set between 0.1 and 10 seconds, preferably between 0.2 and 5 seconds, and most preferably between 0.4 and 2 seconds.

In a preferred embodiment the ladder climbing assistance device is arranged such that movement of the line generates discrete pulses, and that movement is sensed if the number of pulses exceeds a preset value for the first predetermined periods of time and the second predetermined periods of time, respectively; and that no movement is sensed if the number of pulses is less than the preset value for the first predetermined periods of time and the second predetermined periods of time, respectively.

In accordance with another aspect of the invention the ladder climbing assistance device mentioned in the opening paragraph comprises sensing means for sensing any movement of the line, which sensing means is connected to controlling means for controlling the power outlet from the motor in response to signals from the sensing means, which controlling means is arranged to control the power outlet from the motor to:

increase the traction in the line to a predetermined high level when movement of the line is sensed for a first predetermined period of time; and maintain the traction in the line at the predetermined high level when traction is applied to the line and movement of the line is sensed for a second predetermined period of time; and decrease the traction in the line to a predetermined low level when no movement of the line is sensed for the second predetermined period of time.

The advantages achievable by this ladder climbing assistance device are the same as those describe above in relation to the method for regulating the traction in a line of a ladder climbing assistance device.

In a preferred embodiment the sensing means comprises an inductive sensor arranged in proximity of a driving wheel that is connected to the motor and is in frictional engagement with the line. One advantage of using an inductive sensor is that it is does not become worn during use since it is not in contact with any moving elements.

Preferably, the driving wheel is provided with an annular V-shaped groove, and transversally through-going bores are provided close to the rim; the inwardly facing edges of the bores providing frictional engagement with the line and the outwardly facing edges of the bores providing means that are sensible by the inductive sensor. Arranging the driving wheel in this manner implies that no special elements are needed for cooperating with the inductive sensor.

In a preferred embodiment the sensing means is arranged to generate discrete pulses, and movement is sensed if the number of pulses exceeds a preset value for the first predetermined periods of time and the second predetermined periods of time, respectively; and no movement is sensed if the number of pulses is less than the preset value for the first predetermined periods of time and the second predetermined periods of time, respectively. This specifies a specific way of achieving the advantages described above with reference to the method according to the, invention.

The controlling means preferably comprises a, I/O unit that is programmed to control the power outlet from the motor in dependence of the signals from the sensing means.

The line may be windable on a winch, but preferably it forms a closed loop, since this ensures that a part of the line always extends along the ladder such that the person or persons ascending or descending can connect themselves to the line at any time and at any location on the line.

The invention will be described in detail in the following with reference to the drawings in which FIG. 1 shows a schematic side view of a ladder climbing assistance device according to the invention;

Figure 1:
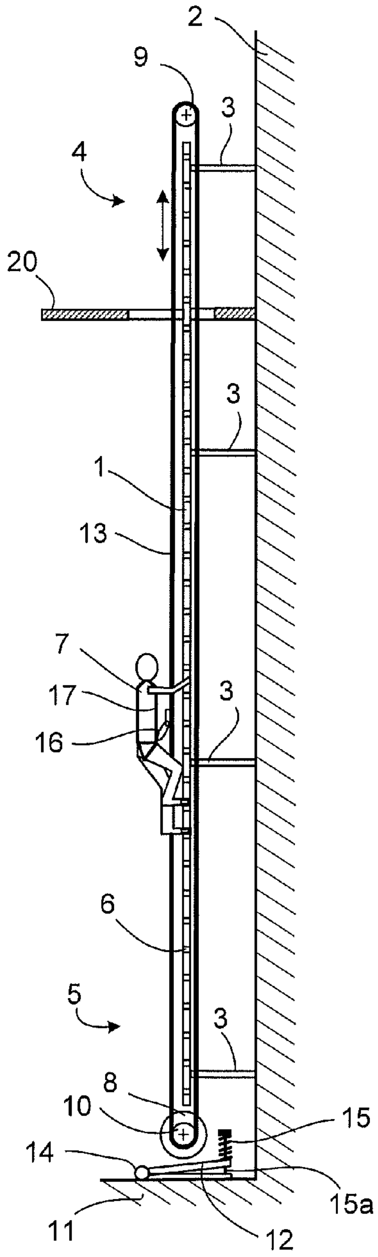

FIG. 1 shows a schematic side view of a ladder climbing assistance device according to the invention used in connection with a ladder 1 that is secured to a wall 2 by brackets 3 distributed along the length of the ladder 1. The ladder 1 has an upper end 4 and a lower end 5 and is provided with steps 6, and a person 7 is ascending or climbing the ladder 1. The ladder 1 can be positioned in windmills, masts, towers, silos, deep wells, etc.; the present invention is, however, independent of the use.

In the embodiment shown in FIG. 1 a motor 8 is provided at the lower end 5 of the ladder 1. The motor 8 is mounted on the floor 11 by means of a mounting support 12 that is hingedly connected to the floor 11 by a hinge 14.

Opposite the hinge 14 the mounting support 12 is provided with a spring 15 that via a bolt 15*a* that is fixed in relation to the floor 11 biases the mounting support towards the floor 11. This arrangement allows the motor 8 on the mounting support 12 to resiliently flex upwards.

The motor 8 is, possibly by gearing, connected to a driving wheel 10 that is shown in greater detail in FIG. 3 and will be described in detail below.

At the upper end 4 of the ladder 1 a wheel 9 is provided. A line 13 forming a closed loop is wound around the driving wheel 10 and the wheel 9 as shown. The biased mounting support 12 forms a tightening arrangement that ensures that the line 13 is stretched at all times.

The line 13 is in frictional engagement with the driving wheel 10 that is drivingly connected to the motor 8. This means that when the motor 8 is activated it rotates the driving wheel 10 in such manner that a predetermined traction is provided in the line 13. If no weight is connected to the line 13, the driving wheel 10 will rotate clockwise. The amount of rotation is controlled electronically in such manner that the person 7 experiences a constant upwardly directed force of a predetermined magnitude, e.g. 400 N, corresponding to a lift of about 40 kg. This means that if the person 7 has a total weight of e.g. 90 kg, he experiences that his total weight is reduced by 40 kg and he only has to carry the remaining 50 kg. Thereby his ascent as well as his descent is facilitated considerably. Controlling the motor 8 in this manner is a generally known technique used in the prior art ladder climbing assistance devices and will not be described further in this specification.

In use, the person 7 approaches the ladder 1 and connects himself to the line 13 by means of any suitable connecting means of which an example is described below with reference to FIG. 2. The connecting means comprises a chain link 16 that is connected to a harness 17 worn by the person 7. When the person has connected himself to the line 13, the motor 8 is activated which in accordance with the invention is achieved by moving the line 13 in either direction (upwards/downwards) This causes the motor 8 to apply a constant traction in the line 13 of e.g. 400 N as described above. When the user starts to ascend the ladder 1 he experiences that his body weight has been reduced by about 40 kg and he can ascend the ladder 1 with great ease without getting too exhausted. Likewise, he can descend the ladder 1 with corresponding ease.

When the person 7 has reached his destination such as a platform 20 he disconnects himself from the line 1 and can start to perform the work to be done at the platform level. If another person (not shown) is to accompany the first person 7 at the platform 20, this second person can immediately connect himself to the line 13, since the line 13 forms a closed loop, and ascend the ladder 1, utilising the ladder climbing assistance device in a manner similar to that described above.

Figure 2:
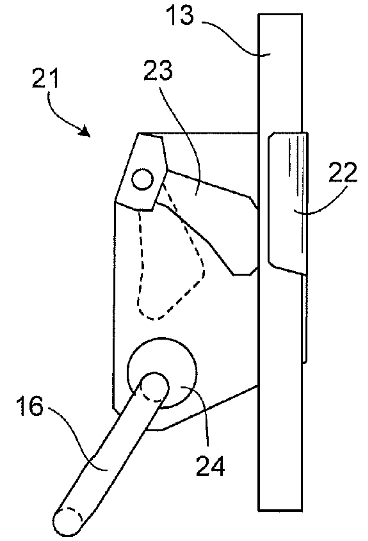
FIG. 2 shows a part of a line and a clamping device in an embodiment for use in the ladder climbing assistance device according to the invention.

FIG. 2 shows a part of the line 13 used in the ladder climbing assistance device shown in FIG. 1 and a preferred embodiment of a clamping device 21 used for connecting a person 7 with the line 13. The line 13 can have any suitable form and be made of any suitable material. Thus it may be a standard rope of the type used in mountain climbing.

The clamping device 21 may also be a standard device used in mountain climbing comprising a bent metal plate forming a line guide 22 and provided with a spring-biased pawl 23 and an attachment opening 24. A connector element such as an openable chain link 16 is attached to the attachment opening 24 and is intended for being connected to a harness 17 worn by the person 7 (see FIG. 1).

In use the person 17 connects the chain link 16 to his harness 17, thereby ensuring safe connection of the clamping device 21 with the harness 17. Then the spring-biased pawl 23 is forced clockwise against the spring force by a finger to the position shown with dotted lines and the line 13 is captured by the line guide 22. Then the spring-biased pawl 21 is released and a spring causes it to turn anti-clockwise until it engages the line 13. Any force now applied to the line in an upward direction causes the spring-biased pawl 23 to engage the line 13 even stronger, thereby ensuring a safe engagement between the line 13 and the clamping device.

When the motor 8 of the ladder climbing assistance device is activated the line 13 is displaced upwards until a constant traction of e.g. 400 N is achieved. At that moment the person 7 experiences a lift via the clamping device 21, the chain link 16 and the harness 17 he is wearing corresponding to 40 kg. This means that when he starts ascending or descending he experiences that his total weight has been reduced by 40 kg and due to the force control of the motor 8, he will constantly experience this weight reduction irrespectively of his ascending or descending speed.

Figure 3:
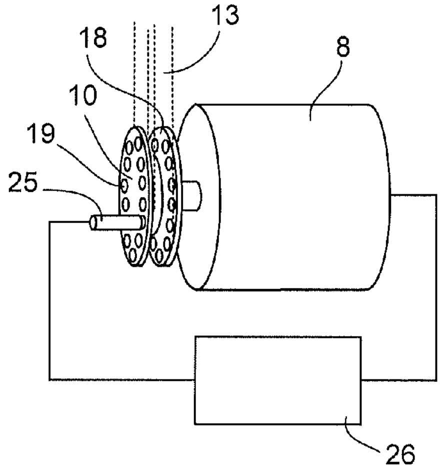
FIG. 3 shows in enlarged scale a driving wheel and schematically the regulating means for ensuring the desired traction in the line.

FIG. 3 shows in enlarged scale the driving wheel 10 and schematically the regulating means for ensuring the desired traction in the line 13. The driving wheel 10 is provided with a V-shaped groove 18 at the rim of the wheel 10. Furthermore, through-going bores 19 are provided close to the rim, and the inwardly facing edges of these bores 19 provide excellent frictional engagement with the line 13 which for clarity reasons is shown in dotted lines. A sensing means 25, which in this embodiment is an inductive sensor, is positioned close to the driving wheel 10. The through-going bores 19 thus also serves as proximity indicators for the sensing means 25, such that when the driving wheel 10 rotates this is sensed by the sensing means which in turn transmits corresponding pulses to controlling means 26 which is only shown schematically. In this embodiment the sensing means 25 transmit a pulse each time a through-going bore 19 passes the inductive sensor. Thus, the frequency of pulses depend on the rotational speed of the driving wheel 10, which in accordance with the invention is utilised to control the starting and stopping of the motor 8.

In the initial state the driving wheel 10 is at still and the motor 8 is switched off. When a person 7 intends to ascend the ladder 1 he connects himself to the line 13 as described above. He then pulls the line 13 in either direction (upwards/downwards) which causes the driving wheel 10 to rotate in either direction. This is sensed by the sensing means 25 which transmit pulses to the controlling means 26 which in turn transmits regulating signals to the motor 8. The controlling means 26 comprises in this embodiment an I/O (input/output) unit or I/O module, which will not be described in further detail herein since a person skilled in the art of regulating and controlling is fully familiar with such means.

In accordance with the invention the I/O unit is programmed to register the pulses over a running first predetermined period of time. If a certain amount of pulses are received within the predetermined period of time the motor 8 is started and traction at a predetermined high level, such as between 300 N and 500 N, is applied to the line 13. Thus, an initial pulling in the line 13 for a certain period of time (typically a few seconds) signals that the person 7 intends to ascend (or descend) the ladder 1 and wants to take advantage of having his weight reduced.

The traction at a high level is maintained as long as the sensing means 25 register that the driving wheel 10 is rotating, i.e. as long as the person 7 moves on the ladder 1. If the person 7 stops his ascending or descending, e.g. for performing work or for taking a break, the driving wheel 10 also stops and the sensing means 25 stops transmitting pulses to the controlling means 26. If none or only a few pulses are received from the sensing means 25 for a second predetermined period of time, the controlling means 26 is programmed to stop the motor 8 and to reduce the traction in the line 13 to 0 N or any other predetermined low level. Whenever the person 7 starts to ascend or descend the ladder 1 again and thereby pulls the line 13, the driving wheel 10 starts rotating and pulses are again transmitted to the controlling means 26, the motor 8 is then started again, an the person 7 experience weight reduction.

Figure 4:
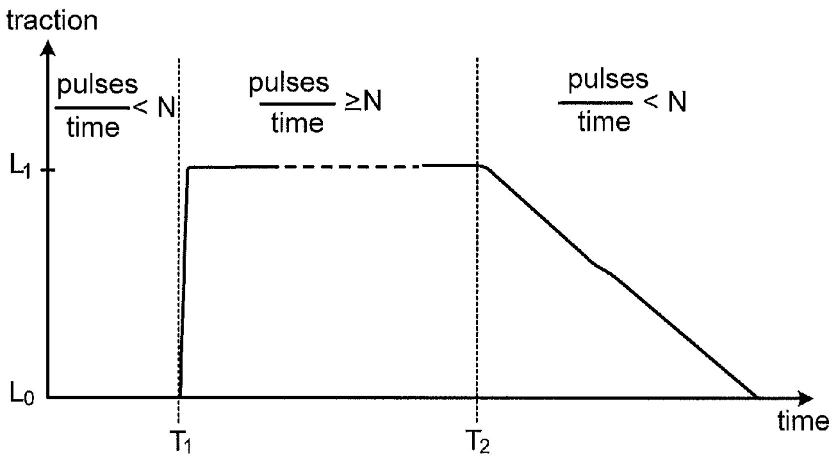
FIG. 4 is a flowchart illustrating a preferred embodiment for the method according to the invention.
Figure 5:
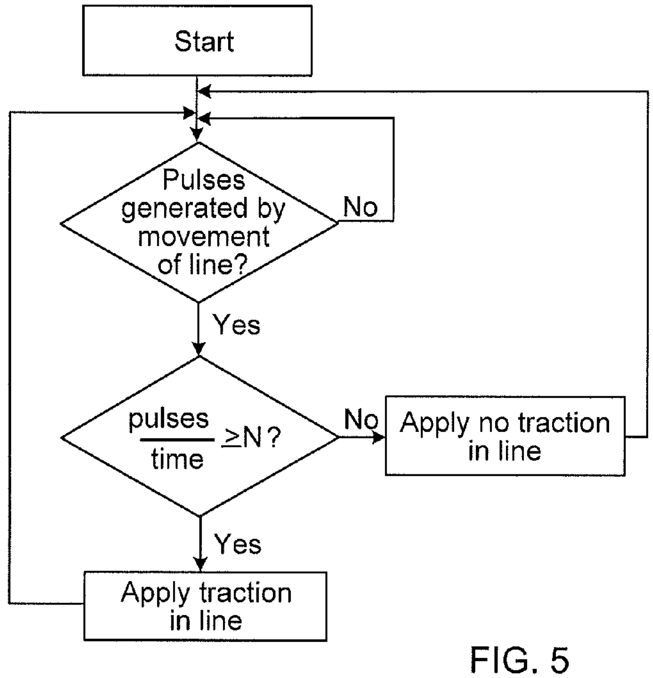
FIG. 5 is a diagram illustrating the traction as function of time under different conditions of movement of the line.

FIG. 4 is a diagram illustrating the traction in the line 13 as function of time under different conditions of movement of the line 13 in a preferred embodiment of the invention. The first part of the time scale, i.e. until $T_1$, indicates the initial state where the ladder climbing assistance device is not in use. Thus, the number of pulses in a predetermined period of time is less than a preset value N as indicated by the shown formula: pulses/time<N. At time $T_1$ a person 7 has connected himself to the line 13 and pulls the line in order to generate pulses from the sensing means 25 to the controlling means 26. When the number of pulses in a predetermined period of time exceeds the preset value N, as indicated by the formula: pulses/time>N, the traction is immediately increased to the predetermined high level $L_1$. The traction is maintained at this level until the person 7 stops at time $T_2$ and pulses from the sensing means 25 to the controlling means 26 are terminated. When this has been registered for some time, i.e. when the formula pulses/time<N again applies, the traction is decreased to a predetermined low level $L_0$, which preferably corresponds to stopping the motor 8 and provide no traction in the line 13. As shown in FIG. 5 the traction is preferably gradually reduced to the low level $L_0$ which means that the person 7 will not experience a sudden loss of weight reduction.

As mentioned above the high level $L_1$ of traction is preferably set between 300 N and 500 N, whereas the low level $L_0$ is set at 0 N. The predetermined period of time for sensing pulses is preferably set between 0.4 and 2 seconds, and the period of time for decreasing the traction to 0 N is preferably also set at 0.4 to 2 seconds. All these limits can of course be set at any other suitable value depending on the actual application of the ladder climbing assistance device.

This manner of operating the ladder climbing assistance device is also shown briefly in FIG. 5 that shows a flowchart illustrating a preferred embodiment for the method according to the invention.

The invention has been described with reference to a preferred embodiment of the ladder climbing assistance device using an inductive sensor as the sensing means and an I/O unit as the controlling means. However, other sensing means and controlling means are conceivable. For instance, the sensing means may comprise means integrated in the motor for sensing whether the driving axle is rotating, or it may comprise means that acts directly on the line.

In the shown embodiment the line is formed as a closed loop. However, nothing prevents the invention to be applied to ladder climbing assistance devices provided with a winch for winding up the line.

Finally, a fall protection system must normally supplement the ladder climbing assistance device; such fall protection system is, however, well-known in the art and is not a part of the present invention.

The invention claimed is:

1. A method for regulating the traction in a line of a ladder climbing assistance device, which method comprises the steps of: sensing any movement of the line; and when no traction is applied to the line and movement of the line is sensed for a first predetermined period of time, the traction is increased to a predetermined high level; and when traction is applied to the line and movement of the line is sensed for a second predetermined period of time, the traction is maintained at the predetermined high level; and when traction is applied to the line and no movement of the line is sensed for the second predetermined period of time, the traction is decreased to a predetermined low level.

2. A method according to claim 1, wherein both the first and second predetermined periods of time are set between 0.1 and 10 seconds.

3. The method of claim 2, wherein both the first and second predetermined periods of time are set between 0.2 and 5 seconds.

4. The method of claim 2, wherein both the first and second predetermined periods of time are set between 0.4 and 2 seconds.

5. A method according to claim 1 wherein the predetermined high level for the traction is set between 100 Newtons and 800 Newtons.

6. A method according to claim 5, wherein the predetermined high level for the traction is set between 200 Newtons and 600 Newtons.

7. A method according to claim 5, wherein the predetermined high level for the traction is set between 300 Newtons and 500 Newtons.

8. A method according to claim 1 wherein the predetermined low level for the traction is set below 100 N.

9. A method according to claim 8, wherein the predetermined low level for the traction is set below 50 Newtons.

10. A method according to claim 8, wherein the predetermined low level for the traction is set to 0 Newtons.

11. A method according to claim 1 wherein the decrease of the traction the predetermined low level takes place over a period of time.

12. A method according to claim 11, wherein said period of time for decreasing the traction is set between 0.1 and 10 seconds.

13. A method according to claim 12, wherein said period of time for decreasing the traction is set between 0.2 and 5 seconds.

14. A method according to claim 12, wherein said period of time for decreasing the traction is set between 0.4 and 2 seconds.

15. A method according to claim 1 wherein movement of the line generates discrete pulses, and that movement is sensed if the number of pulses exceeds a preset value for the first predetermined periods of time and the second predetermined periods of time, respectively; and that no movement is sensed if the number of pulses is less than the preset value for the first predetermined periods of time and the second predetermined periods of time, respectively.

16. A ladder climbing assistance device for use with an essentially vertical ladder, said ladder climbing assistance device comprising: a line that is movable along the ladder, a motor with a power outlet arranged to provide an essentially constant traction in the line; wherein the ladder climbing assistance device comprises sensing means for sensing any movement of the line, which sensing means is connected to controlling means for controlling the power outlet from the motor in response to signals from the sensing means, which controlling means is arranged to control the power outlet from the motor to increase the traction in the line to a predetermined high level when movement of the line is sensed for a first predetermined period of time, and maintain the traction in the line at the predetermined high level when traction is applied to the line and movement of the line is sensed for a second predetermined period of time, and decrease the traction in the line to a predetermined low level when no movement of the line is sensed for the second predetermined period of time.

17. A ladder climbing assistance device according to claim 16, wherein the sensing means comprises an inductive sensor arranged in proximity of a driving wheel that is connected to the motor and is in frictional engagement with the line.

18. A ladder climbing assistance device according to claim 17, wherein the driving wheel is provided with an annular V-shaped groove, and that transversally through-going bores are provided close to the rim; the inwardly facing edges of the bores providing frictional engagement with the line and the outwardly facing edges of the bores providing means that are sensed by the inductive sensor.

19. A ladder climbing assistance device according to claim 16, wherein the sensing means is arranged to generate discrete pulses, and that movement is sensed if the number of pulses exceeds a preset value for the first predetermined periods of time and the second predetermined periods of time, respectively; and that no movement is sensed if the number of pulses is less than the preset value for the first predetermined periods of time and the second predetermined periods of time, respectively.

20. A ladder climbing assistance device according to claim 16 wherein the controlling means comprises an Input/Output unit that is programmed to control the power outlet from the motor in dependence of the signals from the sensing means.

21. A ladder climbing assistance device according to claim 16, wherein the line forms a closed loop.

* * * * *